G. W. CLAMPITT.

Assignor to H. F. BARROWS.

CHAIN FOR WATCHES.

No. 10,000. Reissued Jan. 3, 1882.

*Witnesses.*
Wm. T. Andrews.
H. E. Lodge

*Inventor.*
George W. Clampitt.
F. Curtis. Att'y.

N. PETERS, Photo-Lithographer, Washington, D. C.

UNITED STATES PATENT OFFICE.

GEORGE W. CLAMPITT, OF ATTLEBOROUGH, ASSIGNOR TO HENRY F. BARROWS, OF NORTH ATTLEBOROUGH, MASSACHUSETTS.

CHAIN FOR WATCHES.

SPECIFICATION forming part of Reissued Letters Patent No. 10,000, dated January 3, 1882.

Original No. 120,623, dated November 7, 1871. Application for reissue filed November 29, 1881.

*To all whom it may concern:*

Be it known that I, GEORGE W. CLAMPITT, of Attleborough, in the county of Bristol and State of Massachusetts, have invented certain Improvements in Construction of Chains; and I do hereby declare that the following is a full, clear, and exact description thereof, which will enable others skilled in the art to make and use the same, reference being had to the accompanying drawings, forming part of this specification.

This invention relates to a class of chain-bracelets in which a band of the desired length to form the chain is composed of a series of links or rings arranged in straight rows longitudinally of the chain, and with the links of one row alternating with those of the next in such manner that the links of one row cover the joint between any two adjacent links of the next row, in order that a wire passed through the links of one row shall interlock those of the next, and so on throughout the breadth of the chain.

The object of my invention is mainly to lock the various links together by securing the fastening-wires in place without the use of solder, by which I avoid the expense of such soldering and of subsequently repolishing the entire chain, which becomes discolored by the soldering operation.

Heretofore in the manufacture of this class of chains the ends of the staples or wires which interlock the various links have been soldered together to secure them. This soldering operation, where so many fastenings are required, becomes a tedious and comparatively expensive one, in addition to which the sides of the chain become discolored and annealed, and must be subsequently repolished, which in some styles of chain is laborious and difficult, and in any event the soldered joint does not present a neat finish.

My invention consists in fastening the ends of the staples or wires used for connecting the links of the chain by lapping the said ends by each other and bending, hooking, or twisting them over the outer row of rings upon one side of the chain in such manner as to accomplish the fastening by bending only in lieu of soldering them, as heretofore, thereby saving the labor and injurious effects of such soldering and the subsequent repolishing of the edges of the chain, and avoiding the objectionable appearance of the soldered joints.

Figure 1:
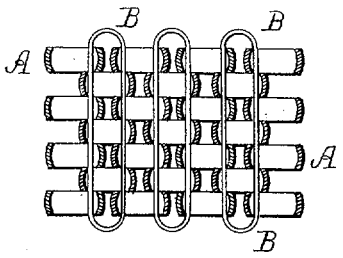
Figure 2:
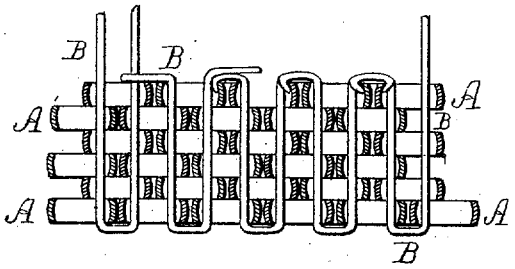
Figure 3:
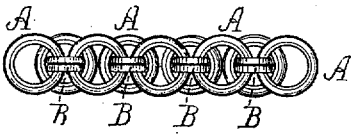

The drawings accompanying this specification represent, in Figure 1, a longitudinal sectional elevation of a piece of flat chain such as is used for bracelets, fob-chains, and the like, composed of multiple rows of links or rings placed side by side, and staples running through them transversely of the chain to lock them together at one edge of the chain, and soldered in the manner heretofore practiced in making these chains. Fig. 2 is a similar view of chain, showing my improved mode of fastening the links, while Fig. 3 is an edge view of the latter.

In the above-named drawings, A A represent the links, and B the staples, which are the same as have heretofore been used, except that I make the staples a little larger, and lap the two ends a short distance past each other and over the outermost links of the various rows at one edge of the chain, subsequently turning each end down into the next adjacent link of the same row, thereby connecting the ends of the staples or wires into hooks which bind the various links together, both transversely and longitudinally of the chain.

I accomplish the fastening of the ends of the wires by first bending the end of each in opposite directions down upon and across the next adjacent link upon opposite sides, and then crowd such ends into the said links by means of a punch driven into the link, the chain being meanwhile held in a suitable clamp.

Having thus described my invention, I claim and desire to secure by Letters Patent the following:

1. In the manufacture of chains composed of a series of alternating interlocking wires or links united by wires passing through the links, the manner herein described of fastening the ends of these locking wires or devices, which consists in bending or clinching the same over adjacent links, substantially as explained.

2. In a chain, the combination of a series of interlocking rows of links or rings with the connecting devices concealed within such links or rings and secured therein by their points being clinched or bent, substantially as explained.

3. As a new article of manufacture, an ornamental chain composed of a series of rows of rings or links secured together by suitable fastening devices, the ends or points of which are secured by bending or clinching in lieu of being soldered, substantially as explained.

GEORGE W. CLAMPITT.

Witnesses:
CHAS. H. RANDALL,
WILLIS J. FOLLETT.